(12) United States Patent
Saavedra Rondo

(10) Patent No.: US 10,866,984 B2
(45) Date of Patent: Dec. 15, 2020

(54) SKETCH-BASED IMAGE SEARCHING SYSTEM USING CELL-ORIENTATION HISTOGRAMS AND OUTLINE EXTRACTION BASED ON MEDIUM-LEVEL FEATURES

(71) Applicant: ORAND S.A., Santiago (CL)

(72) Inventor: José Manuel Saavedra Rondo, Santiago (CL)

(73) Assignee: ORAND S.A., Santiago (CL)

( * ) Notice: Subject to any disclaimer, the term of this patent is extended or adjusted under 35 U.S.C. 154(b) by 66 days.

(21) Appl. No.: 15/750,111

(22) PCT Filed: Aug. 3, 2015

(86) PCT No.: PCT/CL2015/050028
§ 371 (c)(1),
(2) Date: Feb. 2, 2018

(87) PCT Pub. No.: WO2017/020140
PCT Pub. Date: Feb. 9, 2017

(65) Prior Publication Data
US 2018/0232400 A1    Aug. 16, 2018

(51) Int. Cl.
*G06K 9/00* (2006.01)
*G06F 16/532* (2019.01)
(Continued)

(52) U.S. Cl.
CPC ........ *G06F 16/532* (2019.01); *G06F 16/5838* (2019.01); *G06F 16/951* (2019.01);
(Continued)

(58) Field of Classification Search
CPC . G06K 9/46–527; G06K 9/6201–6215; G06N 20/00; G06F 16/00–986
See application file for complete search history.

(56) References Cited

U.S. PATENT DOCUMENTS

| 6,035,055 A | 3/2000 | Wang et al. |
| 8,447,752 B2 * | 5/2013 | Wang ................. G06F 16/5866 707/711 |

(Continued)

FOREIGN PATENT DOCUMENTS

WO    2004/027692    4/2004

OTHER PUBLICATIONS

Lim et al "Sketch Tokens: A learned midlevel representation for contour and object detection" 2013 IEEE Conference on Computer Vision and Pattern Recognition Jun. 2013.*

(Continued)

*Primary Examiner* — Sean T Motsinger
(74) *Attorney, Agent, or Firm* — Terry M. Sanks, Esq.

(57) ABSTRACT

The present invention relates to an image retrieval system using sketches. The system comprises: a device connected to a communication network having an application that allows the user to draw a query result and display images as a result, a processing unit comprising at least one search engine, a component for processing images of a collection, and a storage medium for storing images of the collection along with the feature vectors thereof. The search engine includes: a features extraction component for sketches; a component for performing similarity searches; the image processing component comprises: a component for converting an image to a sketch form and a feature extraction component for sketches. The invention also relates to the associated method.

12 Claims, 5 Drawing Sheets

(51) Int. Cl.
    *G06F 16/951*     (2019.01)
    *G06F 16/583*     (2019.01)
    *G06K 9/46*     (2006.01)
    *G06N 20/00*     (2019.01)
    *G06K 9/62*     (2006.01)

(52) U.S. Cl.
    CPC ......... *G06K 9/4642* (2013.01); *G06K 9/4671* (2013.01); *G06K 9/6212* (2013.01); *G06N 20/00* (2019.01)

(56) References Cited

U.S. PATENT DOCUMENTS

| | | | |
|---|---|---|---|
| 8,555,192 B2* | 10/2013 | Cao | G06F 16/532 715/780 |
| 8,831,358 B1 | 9/2014 | Song et al. | |
| 8,995,716 B1 | 3/2015 | Zomet et al. | |
| 9,449,026 B2* | 9/2016 | Wang | G06K 9/4609 |
| 9,875,253 B2* | 1/2018 | Wang | G06K 9/6215 |
| 10,268,928 B2* | 4/2019 | Jin | G06K 9/6282 |
| 2005/0149360 A1* | 7/2005 | Galperin | G06F 19/321 705/2 |
| 2007/0143272 A1 | 6/2007 | Kobayashi | |
| 2010/0254594 A1* | 10/2010 | Wang | G06T 11/00 382/155 |
| 2010/0260426 A1 | 10/2010 | Huang et al. | |
| 2012/0054177 A1* | 3/2012 | Wang | G06K 9/4609 707/723 |
| 2012/0295231 A1* | 11/2012 | Zitnick, III | G09B 11/00 434/85 |
| 2014/0169683 A1* | 6/2014 | Wang | G06K 9/4604 382/199 |
| 2014/0279265 A1* | 9/2014 | Bhardwaj | G06Q 30/0627 705/26.63 |
| 2014/0328544 A1* | 11/2014 | Wang | G06F 16/5854 382/203 |
| 2016/0132498 A1* | 5/2016 | Wang | G06K 9/6215 382/165 |
| 2016/0203194 A1* | 7/2016 | Park | G06F 3/0482 707/722 |
| 2018/0232400 A1* | 8/2018 | Saavedra Rondo | G06K 9/4642 |
| 2018/0322208 A1* | 11/2018 | Barrios N Nez | G06K 9/62 |

OTHER PUBLICATIONS

Saaverdra et al "An Improved Histogram of Edge Local Orientations for Sketch-Based Image Retrieval" DAGM 2010: Pattern Recognition pp. 432-441 2010.*
International Search Report and Written Opinion, International Patent Application No. PCT/CL2015/050028, dated Mar. 10, 2016, 4 pgs.

* cited by examiner

| | | | | | |
|---|---|---|---|---|---|
| (0,0) | (0,1) | (0,2) | (0,3) | (0,4) | (0,5) |
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (5,5) |
| (5,0) | (5,1) | (5,2) | (5,3) | (5,4) | (5,5) |

Figure 4

SKETCH-BASED IMAGE SEARCHING SYSTEM USING CELL-ORIENTATION HISTOGRAMS AND OUTLINE EXTRACTION BASED ON MEDIUM-LEVEL FEATURES

FIELD

The present invention focuses on a new image search technology using a hand-made drawing (sketch) as a reference. The present invention relates to a system that uses a method of representing sketches by means of gradient orientation histograms calculated by cells in which a sketch is divided. The sketches characterize what users want to find. Considering that regular images do not confirm to the nature of a sketch, the present invention proposes a step for obtaining a sketch from a regular image. For this purpose, the use of medium-level features is proposed which are obtained by means of machine learning algorithms. The proposed system can be applied in various contexts in which it is possible to define a handmade drawing (sketch) as a query. For example: search of products in catalogs, search of photos in the web, search of pieces for manufacturing, search of patterns in biological structures, etc.

BACKGROUNDS OF THE INVENTION

In recent years, the search or retrieval of images has become one of the most relevant areas in Computer Science, mainly due to the advances in the technology relating to the capturing and storage of images as well as the massive use of social networks that encourage the exchange of visual content. In this sense, it is increasingly necessary to have mechanisms capable of managing and automatically organizing the visual content that users can store. For example, it is of great interest to have automatic methods that can group images by similarity, search for images similar to a reference one, recognize objects that are in the images or, in general, interpret in some way the images in a plurality of collections.

The automatic retrieval of images is one of the problems that has been studied for some decades. The objective is to recover a set of relevant images from one or more collections with respect to some certain search criteria. These collections may contain thousands, millions or billions of images. Traditionally, the image search has been based on comparing previously assigned textual descriptions. However, textually describing an image is impractical. In addition, such descriptions can reduce the descriptive richness that an image can contain by itself. For this reason, the efforts during the last decade have been focused on exploiting the own content of the images through what is known as Content Based Image Retrieval (CBIR), whose objective is to develop efficient methods that, taking full advantage of the visual content of the images (e.g., color patterns, texture, shape), produce greater effectiveness in the search by similarity process.

A conventional method to search for images by content must receive a regular image (e.g., a photo) that represents what one wants to find as input. However, in many cases one does not have a sample image to perform a search. In fact, someone may want to perform an image search precisely because they do not have the image they want. To outline the case in which a sample image would be absent, we present the following scenario: Suppose we are in a context of searching for products by images; someone may be interested in buying an art piece with some special shape; that person may have in mind what he would like to find but does not have any image that represents his intention to search; here, the search embodiments that we have been discussing are not applicable.

An alternative to make queries in an image retrieval system is drawing what we want to find. A drawing is an intuitive and natural means of communication between human beings, which may provide enough information about our intention to search. In fact, the drawings were one of the first forms of communication between humans. A drawing can be very detailed or very simple; even, a drawing can represent color and texture. However, a detailed drawing that contains color and texture demands additional time that can turn the search impractical. In addition, a detailed drawing requires certain skills that not every user possesses. In this sense, we will define as "drawing of query" or sketch a handmade drawing based on simple strokes, with little or no information of color and texture. The objective of dealing with this type of drawing is that it can be done quickly by any person, without requiring special skills. This kind of search is known as Sketch-Based Image Retrieval (SBIR). To maintain consistency with the technical use in this area, from now on, we will use the term sketch to refer to the drawings defined above.

Unlike the search for images by content, the number of research works directed to the retrieval of images by sketches is much smaller. However, this number has increased in the last five years. Examples of the proliferation of research in the area are reflected in the works of Mathias Eitz using SIFT descriptors and Bag of Features; Rui Hu with a proposal based on HOG and Jose Saavedra using Keyshapes and Histograms of Local Orientations.

Considering that a sketch is a drawing based on strokes, one of its most relevant features is the orientation of the stroke. Orientation is a feature of the images that has been widely exploited in the computer vision community, which has shown outstanding results in object recognition and characterization tasks. In the case of the search by sketches, this feature has also been exploited by Rui Hu, through the HOG (Histogram of Oriented Gradients) method, and Jose Saavedra, by calculating a histogram of local orientations (HELO).

Although novel methods have been proposed in the area, the results still show poor performance. For that reason, sketch-based image retrieval systems that are based on more effective methods are required. Therefore, the present invention discloses an image or photo search system that uses a new method comprising the following features.

Estimating gradients by cells.
Estimating histograms by blocks.
Estimating gradients and histograms of orientations by interpolation.
Polling of gradients in a weighted manner with respect to their magnitude.
Converting an image to a sketch form through medium-level operations. Traditional techniques use low-level operations (e.g., Canny).
Normalizing the histogram by power normalization.

Technical Problem

The conventional methods in the field of image retrieval by sketches are based on constructing features vectors in the form of histograms that represent the distribution of points or orientations of the strokes that make up a sketch. Some other approaches are based on active outlines, but have not shown high effectiveness in large collections. Another alternative, but more expensive still, is to turn a sketch into a regular image and then continue with a conventional search by content. Unfortunately, the tasks involved in this method represent additional computational cost that makes it impractical for real-time searches.

Other methods extract local features such as SIFT, SURF, HOG or some variations of SIFT, which are then added using the Bag of Features (BoF) methodology. Examples of these methods are those proposed by Eitz, based on SIFT features and Shape Context variations, as well as Rui Hu's method, based on HOG features. Although these methods have shown advances in the field of image retrieval by sketches, they still have low effectiveness which makes them impractical in real environments.

It is also important to mention document US20120054177, which discloses a method for representing and searching for sketches. This method is based on detecting "salient curves" both in the query and in the images of the database. The similarity between a sketch and an image is determined by measuring the similarity between "salient curves" by means of a variation of the Chamfer distance that uses information of position and orientation of the points of the curves. This proposal is entirely different from ours, since our innovation is based on calculating representative gradients by cells using techniques for interpolating and representing outlines of the photos with which a sketch is to be compared.

The low performance shown by the conventional methods can be attributed to the fact that these methods are based on representations that exploit the richness of information that the images provide, neglecting the nature of the sketches. The sketches are scattered representations lacking color and, in many cases, texture as well, so they differ greatly from the nature of a regular image. For example, HOG consists of a large number of vectors of orientations calculated on each of the points of the image. However, considering that a sketch is scattered, the HOG vector can contain many null values, which can negatively affect the performance of the methods.

To address the above problems, Saavedra proposed a method that builds a histogram of edge local orientations (HELO). Thus, a gradient does not represent a single point of the image but a set thereof in a certain location. Saavedra's proposa, although it manages to improve upon the conventional methods, still exhibits low effectiveness. However, one strong point of this proposal is that it no longer represents gradients punctually and takes advantage of the fact that the sketches share similar gradients in one area to focus on the representation of local gradients.

Another relevant aspect that affects the effectiveness of a method is that sketches are compared against regular images, which are representations of a different nature. A sketch is a handmade drawing that has no visual richness such as color or texture, whereas a regular image is a rich source of information wherein the color or texture can be highly discriminative features. This fact also poses a great challenge for achieving high effectiveness from the reduced information that the sketches provide.

To solve the above problem, a sketch-based search system tries to convert a regular image into a sketch type representation. For this purpose, the existing methods are based on obtaining an image of edges or outlines of the images by means of methods that detect intensity variations in the image. These methods are known as low-level methods and often provide images of noisy outlines, because since they are based on measuring intensity differences, any change in intensity, possibly caused by small distortions in the image, may cause the appearance of a wrong edge point. Consequently, comparing a sketch against noisy outlines degrades the effectiveness of a method.

Technical Solution

The present invention relates to a system for performing image searches by means of a handmade drawing (sketch). The proposed system is based on a method that calculates gradients that represent a set of points grouped in cells instead of representing only one point in the image. Unlike HELO, which also calculates local gradients, it is proposed herein that interpolation be used both for the calculation of gradients and for the calculation of histograms. In addition, the present innovation proposes new steps with the aim of increasing the effectiveness in image recovery. The proposed innovation can be applied in several contexts such as the search of products in catalogs or the retrieval of visual content on the web.

A regular image or a sketch consists of R×C points arranged in matrix form. Thus, an image consists of R rows and C columns. In the case of color information, each point has an associated triad (R, G, B) that represents the intensity of color in three channels Red (R), Green (G) and Blue (B). The range of variation of each channel depends on different contexts. An implementation uses the traditional scheme, wherein the range in each channel varies from 0 to 255; thus the value of each channel may be represented by 1 Byte and each pixel will contain 3 Bytes. A grayscale image represents each of its points only by 1 Byte, with 0 being the color black (minimum intensity) and 255 the color white (maximum intensity).

Technical Advantages

The present invention makes it possible to search for images without the need for a sample image as required in the conventional image search by content systems. In contrast, here we propose a system based on a method that allows a user to search for images through a drawing (sketch). Thus, by simply drawing what the user desires, the system is able to retrieve similar images. This technology can be applied to different contexts in which a query can be embodied in the form of a sketch type drawing.

The present invention improves the effectiveness of the known methods through a plurality of features such as: calculating gradients by cells using interpolation, calculating block histograms using interpolation, and generating sketches from regular images through mid-level features. Further, the strategy based on interpolation provides greater robustness to the proposed method facing variations in the position of objects.

The power normalization component allows minimizing the negative effect generated by a possible high level of polling in a very small part of the histogram. Finally, the low complexity of the method facilitates the scaling thereof to large collections.

DESCRIPTION OF THE DRAWINGS

FIG. 4: Diagram of the division of an image into cells.

DETAILED DESCRIPTION OF THE INVENTION

Figure 1:
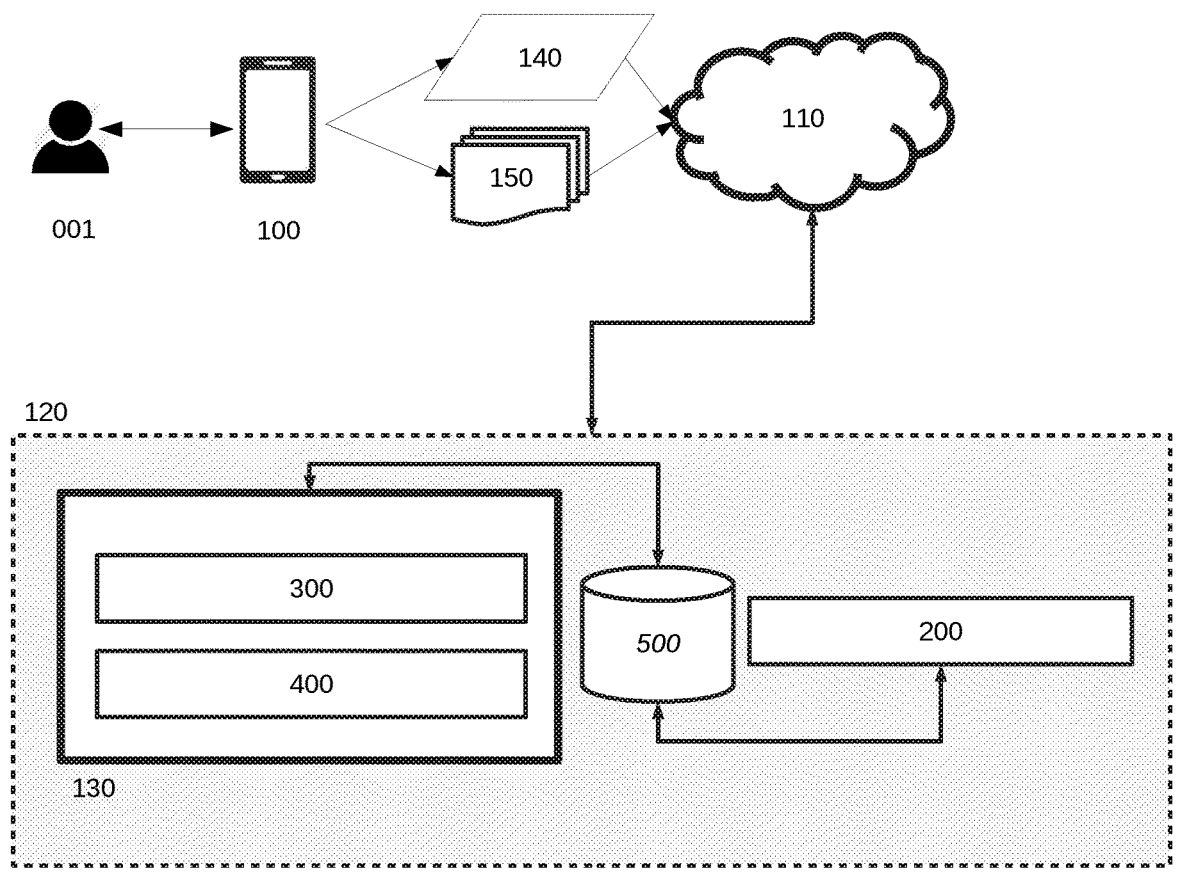
FIG. 1: General diagram.

The present invention relates to a system for performing image searches by means of a handmade drawing (sketch). The system (FIG. 1) involves users (001); a device (100) with connection to a communication network having an application that allows queries (140) and in turn shows results (150); and a processing unit (120), which comprises an image processor (200), a sketches search engine (130) and a storage medium containing the images upon which the searches will be performed along with a set of features associated to each of them. Thus, a user (001) draws on said device (100) what he wants to find. Then, he sends the drawing (140), also called sketch, to the search engine (130) of the processing unit (120) that processes the query (140) and returns the response (150) to the device (100), which will finally show the result to the user (001).

Figure 2:
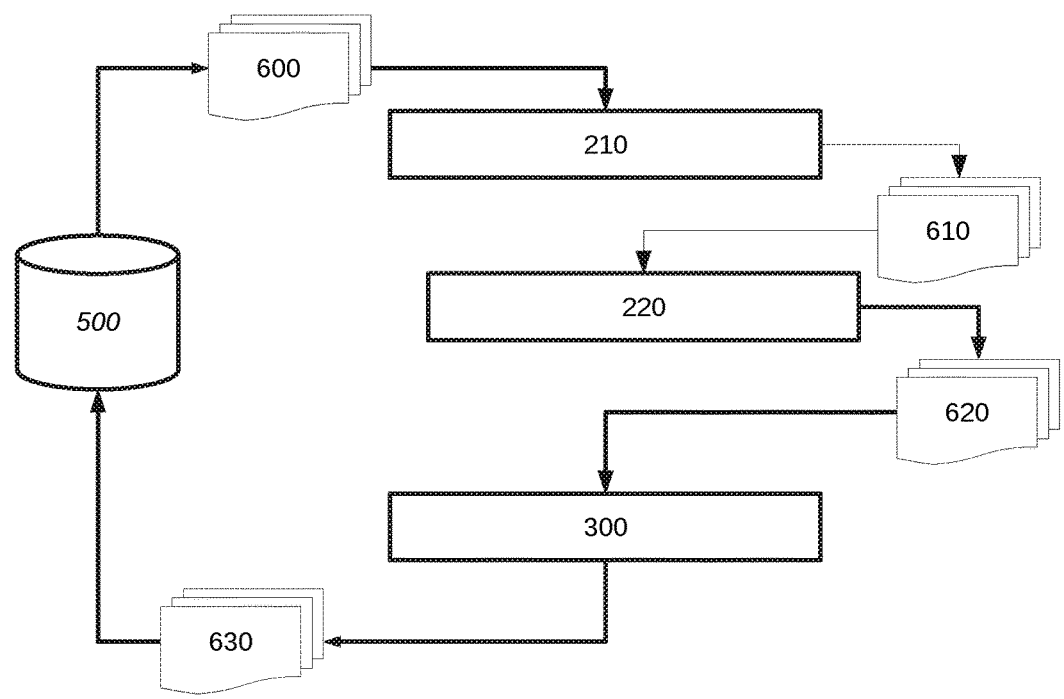
FIG. 2: Image processor (200).
Figure 3:
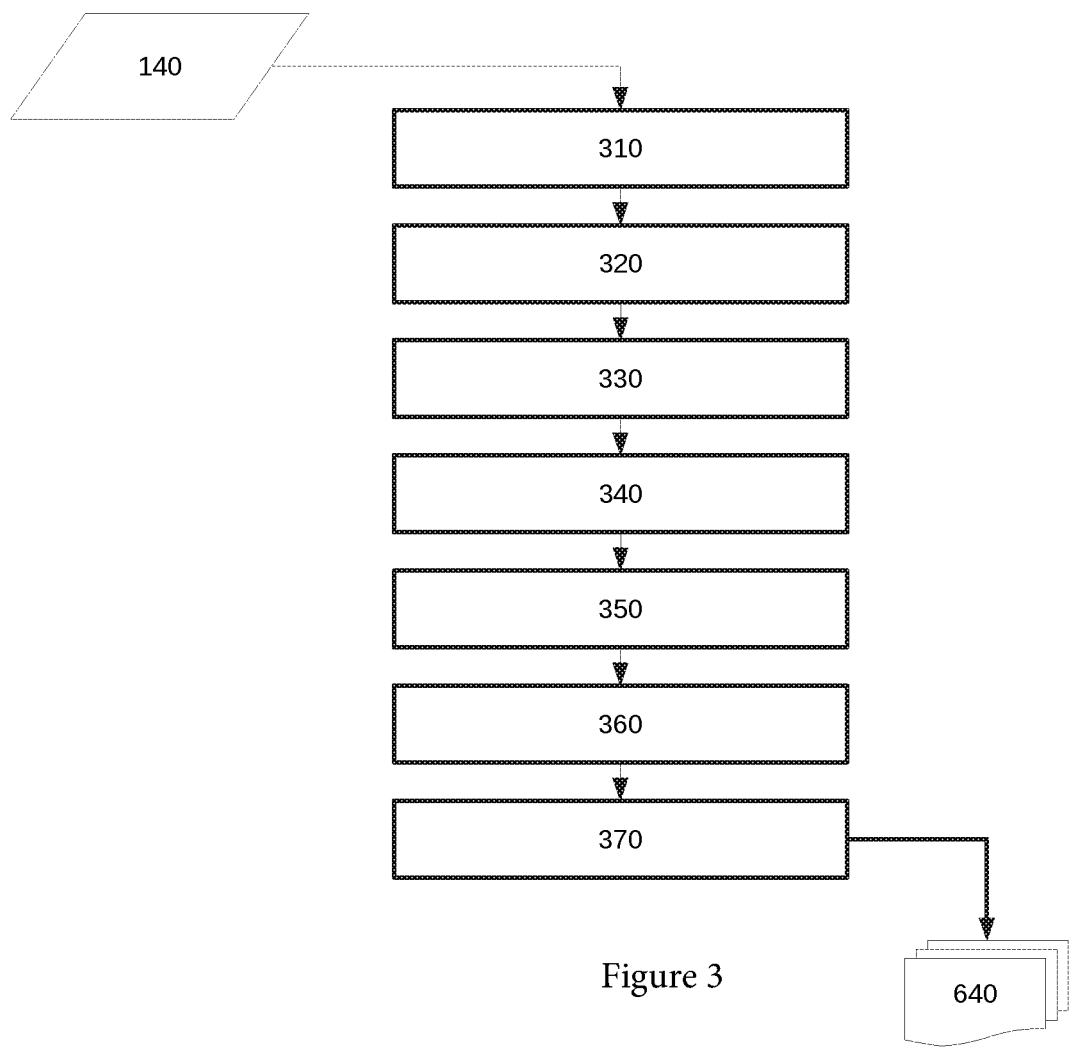
FIG. 3: Features extractor for sketches (300).

The image processor (200) is responsible for pre-processing the set of images upon which it is desired to perform a search (FIG. 2). This is a process that takes place offline. Each of the images (600) is processed under the following steps: (1) A smoothing operation (210) is applied in order to reduce the noise present in the image (600). An implementation can make use of isotropic smoothing filters such as, e.g., Gaussian filters, or can apply anisotropic filters, such as the Malik filter to produce a smoothed image (610). (2) An outline detector (220) generates an image of outlines (620) with respect to the processed image (610) in the previous step. It is important for the image of outlines (620) to be as precise as possible to how a human being would generate an outline on an image. For this purpose, a method based on medium level features is applied, which requires the use of machine learning algorithms during a training process in order to determine if a point of the image should be labeled as part of the outline or not. One implementation uses the method of Lim et al. based on sketch tokens as outline detector. (3) An extractor of features for sketches (300) extracts a features vector (630) from the image of outlines (620). The features vector (630) is stored in the storage device (500) next to the corresponding original image.

Sketch token is a method to detect outlines in images based on a training process in which a classification model that allows determining if a point in the input image corresponds or not to an outline is generated. For this purpose, it is necessary to have a set of training data that must be comprised by regular images, each associated to its corresponding image of outlines. Generally, the image of outlines is made by a human. In the training process, regions, usually 31×31 pixels, are extracted from the images and labeled as outline if the center of the region matches an edge point in the corresponding image of outline and as a non-outline in another case. A machine learning algorithm generates a classification model using the extracted regions. The model allows to label each point of a new image as an outline point or not.

The extraction of features step (300) receives a sketch that may be the representation (620) obtained in the step of extraction of outlines from a regular image (220) or a query sketch (140) drawn by a user (001). At this stage, a sketch is divided into M×N cells, the final size of each cell will depend on the size of an image. For each cell a representative gradient is estimated based on the near point gradients. To avoid the problems generated by the discretization of an image in cells, the representative gradients are calculated by interpolation. Thus, each gradient of a P point collaborates in the calculation of the representative gradient of the four cells nearest to P (see FIG. 5).

Figure 5:
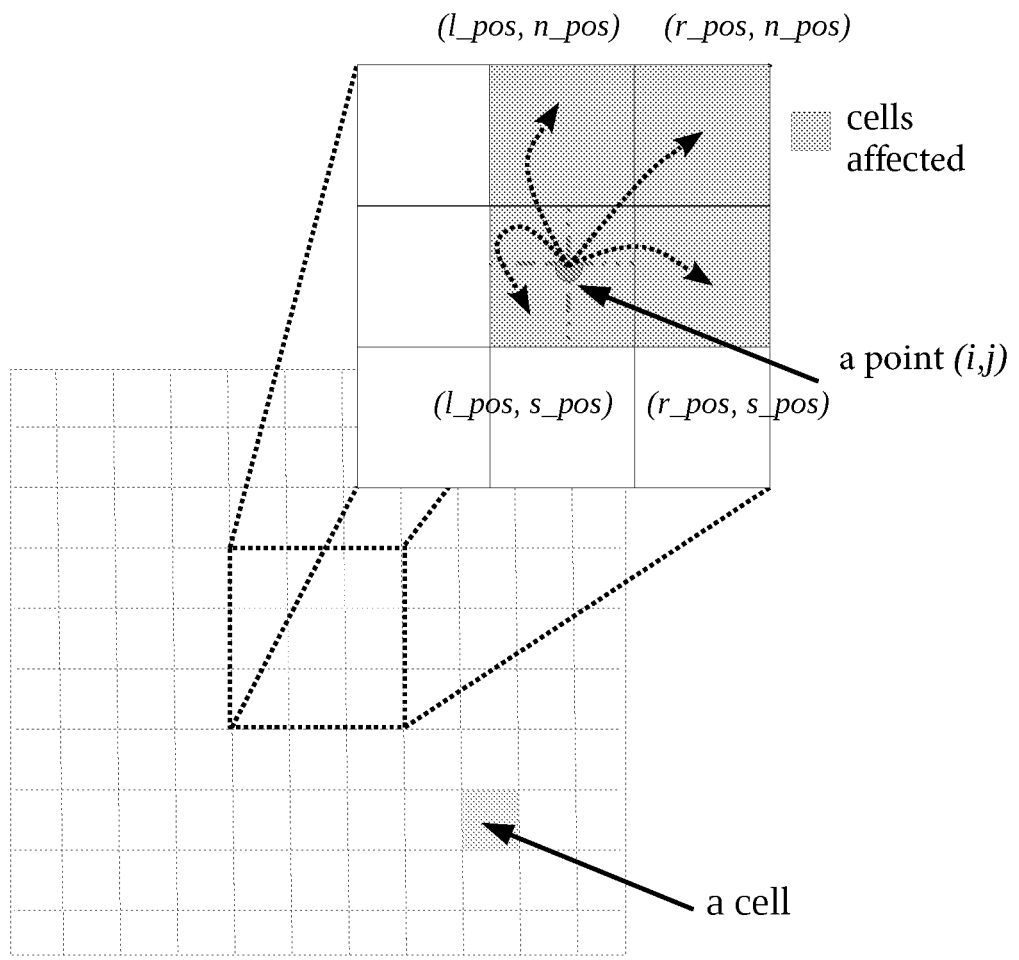
FIG. 5: Interpolation in the calculation of the gradient per cell (320).

Let an image I of R rows and C columns be divided into M×N cells, wherein each cell is listed by (p,q), where p=0 . . . M−1 and q=0 . . . N−1. FIG. 4 schematizes the division of an image into cells with M=N=6. To determine the representative gradient of each cell, all points (i,j) are processed as follows:

1. Determine the four cells nearest to (i,j) as shown in FIG. 5. We can specify each cell near to (i,j) by the following four index pairs (l_pos, n_pos), (r_pos, n_pos), (l_pos, s_pos), and (r_pos, s_pos), where the prefixes l, r, s, n indicate left, right, south and north, respectively. The indexes of the cells are calculated with the following formulas.

$p=(j/C)*N,$ $q=(i/R)*M$ $l\_pos=\lfloor(p-0.5)\rfloor,$ $n\_pos=\lfloor(q-0.5)\rfloor$ $r\_pos=\lfloor(p+0.5)\rfloor,$ $s\_post=\lfloor(q+0.5)\rfloor$ 2. Calculate a weight for each cell affected by (i,j). This weight is calculated inversely to the distance between (i,j) and the center of the underlying cell. The distance is calculated for both the x-axis (columns) and the y-axis (rows). For the x-axis, the p value of the previous formula is used, and for the y-axis the q value will be used. The process is described below using p.

2.1. Calculate the distance of p to the leftmost side of the cell wherein the point (i,j) falls:

$dist_p=p-\lfloor p \rfloor$ 2.2. If $(dist_p<0.5)$ $l\_weight=0.5-dist_p$ $r\_weight=1-l\_weight$ 2.3 If $(dist_p>=0.5)$ $r\_weight=dist_p-0.5$ $l\_weight=1-r\_weight$ Following the steps above, but using the q value, the weights s_weight and n_weight will be obtained, which complete the weights with respect to the four cells near the point (i,j).

3. Calculate the representative gradient for each cell in terms of its orientation and magnitude. For this case, we will use the Square Gradient strategy. To do this, we will define two matrices Ax and Ay, both of the size M×N, which store the components of the representative gradient for each cell.

3.1 Initialize Ax and Ay with all their values at zero.

3.2. For each point (i,j) apply the following steps:

let [Gi, Gj] be the gradient calculated at point (i,j). One implementation uses Sobel.

define theta(i,j)=a tan 2(Gi,Gj)

define n(i,j)=sqrt(Gi*Gi+Gj*Gj)

For each of the four cells (a,b) affected by (i,j), update the corresponding value in Ax and Ay.

let w_a, w_b be the corresponding weights for a, b, respectively with respect to point (i,j).

define alpha(a,b)=w_a*w_b
define cx=cos(theta(i,j))*cos(theta(i,j)−sin(theta(i,j)
    *sin(theta(i,j))
define cy=2*sin(theta(i,j))*cos(theta(i,j))
Update Ax(a,b)=Ax(a,b)+alpha(a,b)*n(i,j)*cx
Update Ax(a,b)=Ax(a,b)+alpha(a,b)*n(i,j)*cy 4. The beta(a,b) orientation of the representative gradient in cell (a,b) is calculated as:

$$beta(a,b)=0.5*a\tan 2(Ay(a,b),Ax(a,b))$$

5. The magnitude of the representative gradient is obtained as the weighted sum of all the gradients that participated in the corresponding cell.

Figure 6:
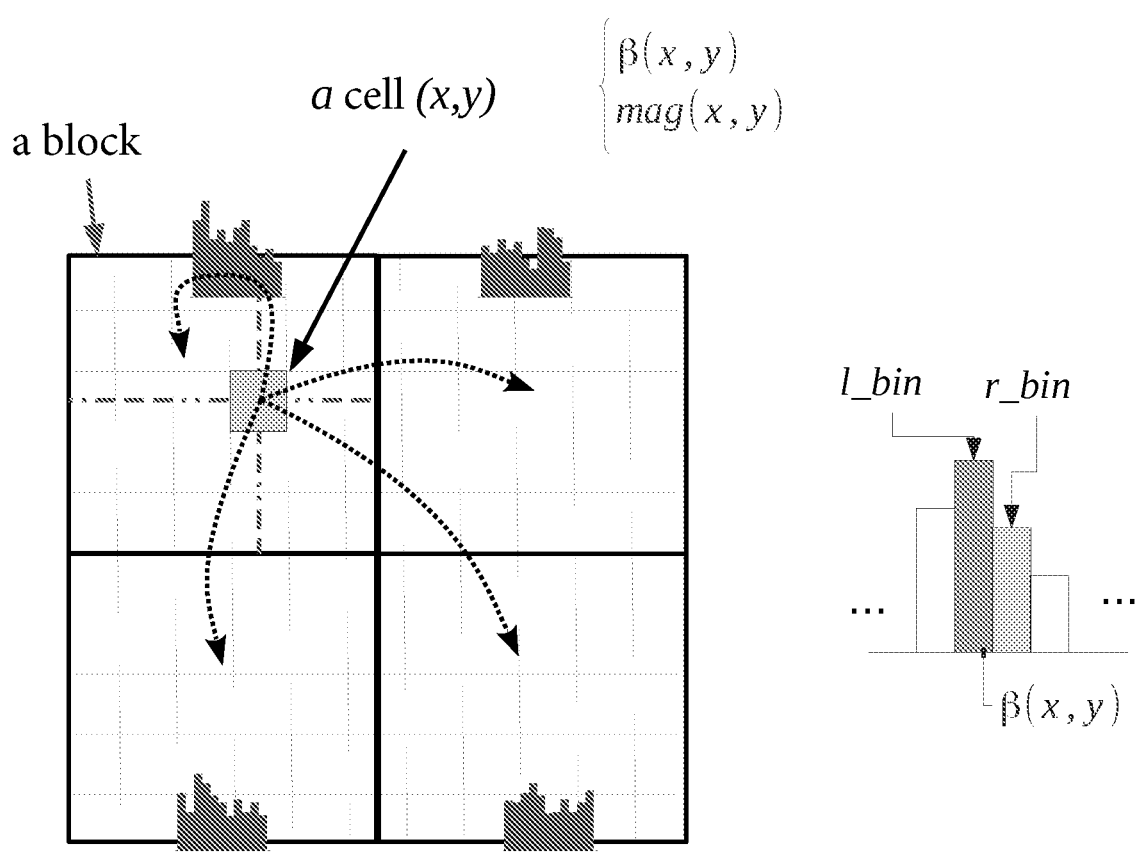
FIG. 6: Interpolation in the calculation of histograms per block (340).

Having calculated the representative gradient for each cell, we proceed to form histograms by blocks. To do this, the image is divided into H1×H2 blocks (340). For each block, a histogram of cells gradients orientations near the block is calculated. Like the previous case, the histogram is calculated by tri-linear interpolation that consists of a bi-linear interpolation with respect to the position of each block and a simple interpolation with respect to the orientation of each cell. The weights of the interpolation are estimated in a manner similar to that described above. In addition, each cell will vote in a weighted manner by the corresponding block histogram. The weighting is performed by the estimated magnitude in each cell. An example of this process is shown in FIG. 6.

Block histograms are normalized (350) independently. One implementation may use L2 normalization. The histogram of the sketch is obtained by adding the histograms per block (360). One implementation uses concatenation of histograms per block as an aggregation method. Finally, the added histogram follows a power normalization, wherein each value of the histogram is raised to the power t(0<t<1). One implementation uses square root normalization wherein t=0.5. The final result is a normalized added histogram (640) which is the features vector of a sketch.

With the method described, implemented in the features extractor component for sketches (300), the features vectors can be calculated in the form of histograms of orientation per cell for image outlines (620) or for query sketches (140).

Before the system is ready to respond queries by sketches, a processing unit (120) loads to memory the features vectors of the set of images about which the searches will be performed, by means of an indexing method. One implementation may use exact or approximate Kd-Tree as an indexing method. The indexing allows to properly arrange the vectors so that a search is efficiently resolved.

When a user makes a query, he draws what he wants to find, thus producing the query sketch (140). Then, the search engine (130) extracts the features applying the above described method (300) to then proceed to search the K most similar images according to the similarity between their corresponding feature vectors represented in the form of histograms of orientation. Considering that the histograms follow a vector representation, these are compared by some vector distance function. One implementation uses a Minkowski function (e.g., Euclidean or Manhattan) as a vector distance function.

The result (150) with the K most similar photos is sent by the communication network (110) to be finally submitted to the user (001) through the device (100).

One implementation may associate the set of images to search with a product catalog. Thus, we would be in an application for product search using sketches.

The invention claimed is:

1. An image retrieval method using sketches, characterized in that it comprises the following steps:
   a. processing a set of images from a collection stored in a data storage means to extract outlines and features vectors for sketches;
   b. the user entering a query on a device with connection to the network through an installed application and sending the query to a processing unit;
   c. receiving the query in the processing unit to:
      i. extract features of the sketch type query, the extract method comprising the steps of:
         a. dividing the sketch into a set of cells;
         b. calculating representative gradients by cells;
         c. dividing the sketch into blocks;
         d. calculating histogram of cells orientation for each block;
         e. normalizing vectors per block;
         f. generating an added histogram based on the histograms per block;
         g. normalizing the added histogram;
      ii. perform a search by visual similarity between a query and all the images stored in the data storage means using features for sketches;
   a. receiving the answer to the query from the device with network connection and displaying it to the user.

2. The method according to claim 1, characterized in that the outline extraction method is based on machine learning.

3. The method according to claim 1, characterized in that the outline extraction method uses sketch tokens.

4. The method according to claim 1, characterized in that the outline extraction method uses the Canny operator.

5. The method according to claim 1, characterized in that the sketch is an image of outlines obtained from a regular image.

6. The method according to claim 1, characterized in that the calculation of gradients per cell uses bi-linear interpolation.

7. The method according to claim 1, characterized in that the calculation of histograms per block uses tri-linear interpolation.

8. The method according to claim 1, characterized in that the calculation of the added histogram is made by concatenating the histograms per block.

9. The method according to claim 1, characterized in that the normalization of the added histogram uses power normalization.

10. A method for extracting features from sketches based on histograms of local gradients with interpolated voting, comprising the following steps:
   a. dividing the sketch image into a set of cells;
   b. calculating a representative gradients for each cell, where the representative gradient is computed as an average of all the gradients that fall in or near to the cell, and this average is computed using the components sine and cosine of a modified gradient vector per each point; a modified version of a gradient vector is generated by doubling the angle and squaring the magnitude, where doubling the angle aims to avoid that opposite gradients cancel each other, while squaring the magnitude allows to strengthen gradients with high magnitude;
   c. dividing the sketch into blocks;
   d. calculating histogram of cells orientation for each block using the representative gradients;
   e. normalizing vectors per block dividing it by its norm;
   f. generating a final histogram concatenating the histograms per block;

g. normalizing the resulting histogram by the square root normalization method by computing the square root of each value in the vector, and transforming the result to a unit vector.

11. The method according to claim 10, characterized in that the computation of representative gradients is done by bi-linear interpolation, where each pixel's gradient contributes to the four nearest cell, and the contribution is weighted inversely to the distance between the pixel location to the center to the corresponding cell.

12. The method according to claim 10, characterized in that the calculation of histogram per block uses tri-linear interpolation, where each cell's gradient contributes to the four nearest blocks, and the contribution is weighted inversely to the distance of the cell location to the center of the corresponding block; in addition, as a histogram is being computed, the angle of the cell gradient will vote to the two closer buckets, weighted by distance between the angle and the value represented by the buckets.

* * * * *